United States Patent [19]

Fox

[11]  4,324,298

[45]  * Apr. 13, 1982

[54] METHOD OF USING A REACTIVE IRON OXIDE DRILLING MUD ADDITIVE

[75] Inventor: Irwin Fox, Ballwin, Mo.

[73] Assignee: Ironite Products Company, St. Louis, Mo.

[*] Notice: The portion of the term of this patent subsequent to Feb. 22, 1994, has been disclaimed.

[21] Appl. No.: 185,155

[22] Filed: Sep. 8, 1980

Related U.S. Application Data

[63] Continuation-in-part of Ser. No. 44,026, May 31, 1979, Pat. No. 4,246,244.

[51] Int. Cl.$^3$ .................. C09K 7/04; B01D 53/34
[52] U.S. Cl. .......................... 175/64; 175/66; 423/225; 423/231; 252/8.55 B; 252/8.55 E
[58] Field of Search ............. 423/230, 231, 225, 632; 175/64, 66, 63; 252/8.5 E, 8.55 B, 8.55 E

[56] References Cited

U.S. PATENT DOCUMENTS 4,008,775  2/1977  Fox ..................................... 175/64
4,246,244  1/1981  Fox ..................................... 423/231

*Primary Examiner*—Earl C. Thomas
*Attorney, Agent, or Firm*—Jerome A. Gross

[57] ABSTRACT

Iron oxide particles having a high surface area, a high kinetic K value and composed substantially of amorphous $Fe_2O_3$ and crystalline $Fe_2O_3$ are drilling mud additives suitable for scavenging hydrogen sulfide. Such particles do not adversely affect the rheological properties of the mud and when reacted with hydrogen sulfide form reaction products which are acid stable. Upon completion of drilling, the drilling mud containing these iron oxide particles and their reaction products with $H_2S$ may be left in place between the inner casing and the formation wall or the outer casing as a packer fluid.

2 Claims, No Drawings

METHOD OF USING A REACTIVE IRON OXIDE DRILLING MUD ADDITIVE

CROSS-REFERENCE TO RELATED APPLICATIONS

This application is a continuation-in-part of Ser. No. 44,026, filed May 31, 1979, entitled PROCESS FOR SCAVENGING HYDROGEN SULFIDE FROM HYDROCARBON GASES, co-pending herewith, now U.S. Pat. No. 4,246,244, and as to its common disclosed subject matter, the benefit of the filing date thereof is hereby claimed.

BACKGROUND OF THE INVENTION

Hydrogen sulfide is frequently encountered in drilling oil and gas wells. It is corrosive to iron or steel drill pipe and casings. When the drill pipe breaks due to hydrogen sulfide embrittlement, the drilling operation must be interrupted and the drill pipe string repaired, thus increasing the cost of the drilling operation. Hydrogen sulfide is also a pollutant to the environment and a health hazard to drilling personnel.

It has been proposed to use certain specific iron oxides in drilling muds to scavenge hydrogen sulfide released during the drilling operation. For example, in my U.S. Pat. No. 4,008,775, issued Feb. 22, 1977, I described the use of a specific porous iron oxide in drilling mud to scavenge hydrogen sulfide. This iron oxide is described as having an ideal composition of substantially $Fe_3O_4$ and a surface area at least ten times as great as magnetite particles of equal size. In my co-pending application Ser. No. 44,026, referred to above, I have further characterized that porous iron oxide as having an amorphous (non-crystalline) moiety of $Fe_2O_3$ together with an $Fe_3O_4$ crystalline phase. In my application, Ser. No. 963,747, filed Nov. 27, 1978, and now abandoned, I have also disclosed that certain specific iron oxide waste dusts from open hearth or basic oxygen furnace steel-making operations can be used to scavenge hydrogen sulfide in well drilling muds or to scavenge same from hydrocarbon gases. As described in application Ser. No. 44,026, filed subsequently, these iron oxide waste dusts, like the iron oxide described in the aforementioned patent, are also iron oxide particles of large surface area and now are found to have an amorphous moiety of $Fe_2O_3$ and an $Fe_3O_4$ crystalline phase.

OBJECTS OF THE INVENTION

It is an important object of the present invention to provide a different form of iron oxide which is substantially $Fe_2O_3$ and is useful in drilling muds as an effective scavenger for hydrogen sulfide, thereby reducing corrosion or embrittlement of drill pipe and casings and avoiding health hazards to drilling personnel.

Other objects are to provide large surface area iron oxide particles composed substantially of $Fe_2O_3$ which react with hydrogen sulfide in such muds to form products which do not regenerate hydrogen sulfide in the presence of strong acids.

SUMMARY OF THE INVENTION

The present invention provides a method of scavenging hydrogen sulfide from oil well drilling muds utilizing in such muds exceptionally hydrogen-sulfide-reactive iron oxide particles comprising a form of iron oxide of large surface area and composed substantially of an amorphous $Fe_2O_3$ moiety and an $Fe_2O_3$ crystalline phase, and impurity levels in bulk of less than 10% with respect to any contaminating element. Upon reaction with hydrogen sulfide present in drilling mud, these iron oxides are converted to products which do not regenerate hydrogen sulfide in the presence of strong acids.

Briefly summarizing, and without limitation, the method of the present invention comprises incorporating these iron oxides in drilling muds and employing the resultant mud in a gas and/or oil-drilling operation in a conventional manner. These iron oxides are incorporated ordinarily in combination with clay and other conventional additives such as weighting agents, caustic for pH adjustment, calcium compounds for conditioning in calcium formations and for pH control. In addition, these iron oxides can be utilized in drilling muds with hydrocarbons for fluid loss control and lubrication, sealants, thinners such as lignosulfomates and tannins for dispersion of mud solids, and bactericides.

While the use of certain specific iron oxide particles for scavenging hydrogen sulfide from hydrocarbon gases has been described in my copending application Ser. No. 44,026, referred to above, it may not have been predicted from that utility that the iron oxide particles utilized in drilling muds would perform satisfactorily in scavenging hydrogen sulfide from drilling muds. The reason for this is that the various components of a drilling mud possibly may interfere with the reaction between the iron oxide particles and the hydrogen sulfide, whereas such components are not present when scavenging hydrogen sulfide from hydrocarbon gases in the manner described in said prior application.

DESCRIPTION OF THE PREFERRED EMBODIMENT

The reactive iron oxide particles utilized in the present process are formed by the conventional high temperature oxidation of ferrous sulfate with rapid cooling. As noted previously herein, these iron oxide particles are composed substantially of an amorphous $Fe_2O_3$ moiety and an $Fe_2O_3$ crystalline phase. The preferred iron oxide particles comprise a major portion of amorphous $Fe_2O_3$. In addition, such particles have unique physical and chemical properties which make them particularly suitable in practicing the processes of this invention.

Table I lists representative iron oxides of the present invention (compound D) together with certain iron oxide particles described in my aforesaid co-pending application (compounds A–C) and prior art iron oxides, and summarizes those physical and chemical properties, hereafter explained, which are found to be significant.

TABLE I

| Iron Oxide | Fe ESCA/ AUGER | X-ray Diffraction unreacted | X-ray Diffraction reacted | Kinetic "K" value | acid sta- bility | surface area $m^2/g$ |
|---|---|---|---|---|---|---|
| A | $Fe_2O_3$ | $Fe_3O_4$ | $FeS_2$, $Fe_3S_4$, $FeS^*$ | 2000 | 86.6% | 7.0 |
| B | $Fe_2O_3$ | $Fe_2O_3/$ $Fe_3O_4$ | $FeS_2,S^*$ | 36.3 | 73.7% | 9.0 |
| C | N.A. | $Fe_2O_3/$ $Fe_3O_4$ | $FeS_2,S^*$ | 100 | 93.8% | 4.0 |
| D | $Fe_2O_3$ | $Fe_2O_3$ | $FeS_2$ | 4000 | 85.0% | 4.0 |
| O[*2] | $Fe_3O_4$ | $Fe_3O_4$ | N.A. | 1.0 | 18.7% | 1.0 |
| P[3] | N.A. | $Fe_3O_4$ | $FeS_x$ | 1.0 | 20.0% | 1.0 |
| Q[4] | $Fe_2O_3$ | $Fe_2O_3$ | FeS, $Fe_2S_x$ | 1.2 | 18.6% | 14.0 |

TABLE I-continued

| Iron Oxide | Fe ESCA/ AUGER | X-ray Diffraction unreacted | X-ray Diffraction reacted | Kinetic "K" value | acid sta-bility | surface area m²/g |
|---|---|---|---|---|---|---|
| R[5] | N.A. | N.A. | N.A. | 1.0 | 50.0% | N.A. |

N.A. = Not Analyzed
[2] =magnetite
[3] =hematite
[4] =iron oxide made according to the method of Meuser, Canadian Patent No. 495,690
[5] = millscale Samples of various particles were subjected to ESCA and AUGER analysis. In ESCA spectroscopy, a beam of monochromatic X-rays impinge upon the atoms at a sample surface, striking electrons and displacing them at energy levels characteristic for each valence state of element present. AUGER spectroscopy is similar to ESCA, except that the sample is bombarded with high-energy electrons instead of X-rays. AUGER electrons are emitted at characteristic energies for the various elements in particular valence states. These techniques analyze only the sample surface (less than 100 A° interior to the sample) in contrast to X-ray fluorescence which quantifies elements detected in bulk.

X-ray diffraction analysis detects only the crystalline phase of iron oxides; it will not yield a diffraction pattern for any iron oxide in which the Fe and O atoms are not organized into a crystalline lattice structure. It is concluded, from comparison of the ESCA/AUGER analysis and X-ray diffraction, that the $Fe_2O_3$ detected at the surface of any particle must be at least partially non-crystalline (amorphous).

Referring to Table I, ESCA/AUGER analysis of the compound classes A, C and D shows that the surface of the particles comprises exclusively $Fe_2O_3$, regardless of crystalline content revealed by X-ray diffraction, which may be $Fe_3O_4$, $Fe_2O_3$ and combinations thereof. In the case of compound A, all of the $Fe_2O_3$ present must be amorphous since the only crystalline phase detected by X-ray diffraction analysis is $Fe_3O_4$. The amorphous nature of the $Fe_2O_3$ in compound D cannot be directly determined since all of the iron is present in its highest oxidation state as $Fe^{+++}$; however, the amorphous property may be inferred from the high kinetic "K" value of reaction with hydrogen sulfide; also, compound D appears to have a relatively low density compared to that of crystalline hematite (data not shown).

The amorphous $Fe_2O_3$ moiety of compound classes A, B and C was further identified by ion titration analysis. In ion titration, the amounts of iron in the $Fe^{++}$ and $Fe^{+++}$ oxidation states are measured simultaneously and compared to corresponding values for pure $Fe_2O_3$ and Fe standards. If the particles were composed substantially of $Fe_3O_4$, as indicated by strong X-ray diffraction patterns, then the ferric ($Fe^{+++}$) content would approximate 47.7% of the total iron, and $Fe^{++}$ iron would be present at approximately 27.6%.

Ion titration performed on the present iron oxide powders (compound classes A, B and C) shows that $Fe^{+++}$ content is much higher than would be predicted by X-ray diffraction analysis; $Fe^{++}$ levels are correspondingly lower than for the pure $Fe_3O_4$ standard (see Table II).

TABLE II

| Iron Oxide | Ion Titration* Fe++ (%) | Ion Titration* Fe+++ (%) | Total Fe |
|---|---|---|---|
| A | 11.3 | 57.0 | 68.3 |
| B | 3.6 | 24.7 | 28.3 |
| Pure $Fe_2O_3$ | 2.8 | 67.2 | 70.0 |
| Pure $Fe_3O_4$ | 27.6 | 47.7 | 72.3 |

*Method of Kolthoff and Sandell

Thus, these particles have an $Fe^{+++}$ content intermediate to that for pure standards of $Fe_2O_3$ and $Fe_3O_4$. It is concluded that the excess of iron in the $Fe^{+++}$ valence state is present in non-crystalline form as an amorphous $Fe_2O_3$. The $Fe_2O_3$ stoichiometry is confirmed by the ESCA and AUGER spectroscopy described hereinabove.

It will be noted from the foregoing that compound D (with which the present invention is concerned) is composed of amorphous $FeO_3$ and crystalline $Fe_2O_3$ and there is no indication that any form of $Fe_3O_4$ is present. Thus a preferred form of iron oxide particles of this invention can be said to be substantially free of $Fe_3O_4$. In contrast, the compounds A–C contain a significant amount of crystalline $Fe_3O_4$. Also, it will be noted from Table I that compound D has a much higher kinetic "K" value than compounds A–C, a surface area of at least 4 m²/g and an acid stability of 85%. Generally, the iron oxide particles used in the process of this invention have a kinetic "K" value in excess of 3000, an acid stability in excess of 75% and a surface area of at least 3.5 m²/g.

Referring again to Table I, it will be noted that the only reaction product formed from the present iron oxide particles (compound D) and hydrogen sulfide is $FeS_2$—as detected by X-ray diffraction, whereas the reaction products from compound A are $FeS_2$, $Fe_3S_4$ and $FeS°$ and those from compounds B and C are $FeS_2$ and $S°$. This illustrates the unpredictability of the reaction between these various iron oxides and hydrogen sulfide.

The kinetic "K" values set forth in Table I were obtained in the manner described in my said co-pending application Ser. No. 44,026, and are hereby incorporated by reference. Reaction kinetics of various iron oxides in reaction with hydrogen sulfide were compared to kinetic results reported in the literature. In the pH range 8–10, the desired rate law for compound A is as follows:

$$\frac{d[S_t]}{dt} = -K \times [S_t]^2 \times [H^+]^{1.06} \times [A]$$

wherein $[S_t]$ is sulfide concentration in ppm, t is time in minutes, $d[S_t]/dt$ is the instantaneous rate of change of dissolved sulfide concentrations, $[H^+]$ is hydrogen ion concentration and [A] is iron oxide concentration (lb./bbl.). K is the rate constant in $min^{-1}$ $ppm^{-1}$ $cm^{-2} \times 1/mole$ and equal to approximately 3000. At pH 8–10, the desired rate law agrees closely with Rickard's Analysis of the reaction of hydrated iron oxide (ferric hydroxide) and hydrogen sulfide [Am. J. Sci., 274:941 (1974)].

Substitution of observed $[S_t]$ and $[H^+]$ values at low pH into the rate law equation above, yields apparent "K" values which define relative differences in reaction rates among different compounds. As noted above, compound D (of the present invention) has substantially higher kinetic "K" values than any of the other iron oxides compared in Table I.

The acid stability values set forth in Table I were determined in accordance with the following procedure. Ferrous sulfide (FeS) was prepared by the reaction of $Fe(NH_4)_2(SO_4)_2$ and $Na_2S$ in water; a black FeS precipitate was recovered and washed to remove unreacted sulfide. In water solution (200 mls.), the FeS precipitate (2400 total ppm sulfide) rapidly regenerates $H_2S$ upon addition of strong acid (10 mls. concentrated HCL). The liberated $H_2S$ is bubbled into a $ZnCO_3$ trap and assayed. In the test series, the iron oxides of Table I were introduced individually into the 200 ml. slurry of FeS prior to acidification. Strong acid was then added and the amount of $H_2S$ recovered in a zinc carbonate trap measured after one-half hour. The rationale of these experiments is as follows: if the $H_2S$ liberated from the FeS precipitate upon acidification reacts with the iron oxide to produce FeS or other species of iron sulfide unstable in the presence of acid, these unstable reaction products will regenerate sulfide as $H_2S$ gas which bubbles into the zinc carbonate trap. However, if the liberated $H_2S$ reacts with the particular iron oxide to produce an acidstable product of reaction, it will be fixed in the reaction vessel and will not pass into the zinc carbonate trap.

The products of reaction formed from the iron oxides of the present invention are deemed to be acid-stable if they are at least 75% stable in the presence of strong acid when tested by the foregoing assay.

The surface area values in Table I were determined using the So-Bet and Absorptomat methods. The iron oxides employed in the present invention have a surface area of at least 3.5 $m^2/g$, and preferably 4 $m^2/g$.

Impurities in the iron oxides of the present invention have an adverse effect on the hydrogen sulfide scavenging efficiency, and therefore it is necessary to use iron oxides in which any free element of impurity does not exceed about 10% by weight. Preferably, the iron oxides used are substantially free of impurities or contain impurity levels of any free element in bulk of less than 5.0% by weight.

The procedures of use for the iron oxide particles may be as disclosed in my U.S. Pat. No. 4,008,775 which is hereby incorporated by reference. A suitable quantity of the particles are added to the drilling mud. The quantity chosen is sufficient to react with substantially all of the hydrogen sulfide released from the formation of the well being drilled, and may vary in the range of 2 to 20 pounds per barrel of mud. The fine powdery particles do not clump on being mixed into the water-based mud but are suspended fairly evenly through it. On pumping the mud during drilling, as the mud rises from the drill bit up the formation wall the hydrogen sulfide will first be entrained in the mud and while entrained, reacted by the iron oxide particles, to form essentially $FeS_2$. This product, which is acid stable as described herein, may be safely removed and disposed of. The reaction with the hydrogen sulfide escaping from the formation wall may be expected to be complete; that is, the iron oxide particles will react with the hydrogen sulfide preferentially to the $H_2S$ reaction with the iron present in drill equipment or casings. Thus, the embrittlement of the drill pipes or casing is substantially avoided, and drilling personnel are not subjected to the health hazard of $H_2S$ gas.

In summary, the present invention provides a new use for large surface area iron oxide particles comprising substantially amorphous $Fe_2O_3$ and a crystalline $Fe_2O_3$ phase. These particles react rapidly with hydrogen sulfide thereby scavenging it during drilling operations, and also forming reaction products which are quite stable in an acid or alkaline environment in that they do not degrade to $H_2S$ in significant amounts. Moreover, these iron oxide particles do not appear to adversely affect the rheological properties of the drilling mud.

I claim:

1. A process of scavenging hydrogen sulfide contained in drilling mud comprising the following steps:
   A. providing a drilling mud including a water-based suspension of iron oxide particles having a surface area of at least 3.5 $m^2/g$ and a kinetic "K" value in excess of 3000, said particles being comprised substantially
      (1) of amorphous $Fe_2O_3$ and a crystalline $Fe_2O_3$ phase and substantially free of crystalline $Fe_3O_4$, and
      (2) having impurity levels of any free element in bulk of less than 10% by weight,
      in a quantity sufficient to react such hydrogen sulfide as may be encountered,
   B. circulating the drilling mud down the interior of the drill pipe, through the drill bit and up the space between the drill pipe and the formation wall to the surface,
   C. entraining in the circulating mud such hydrogen sulfide as may be encountered, and
   D. reacting the entrained hydrogen sulfide with the said iron oxide particles under the pressure there present to form substantially acid-stable products of reaction.

2. A process as in claim 1 wherein the said crystalline phase comprises substantially the core of said iron oxide particles and the amorphous phase comprises substantially the surface layer thereof.

* * * * *